United States Patent
Liu

(12) 
(10) Patent No.: US 8,650,672 B2
(45) Date of Patent: Feb. 18, 2014

(54) WATER LEAKAGE PROTECTING DEVICE

(75) Inventor: Yongmao Liu, Fujian (CN)

(73) Assignee: Lab (Xiamen) Santitary Fitting Inc., Xiamen, Fujian (CN)

( * ) Notice: Subject to any disclaimer, the term of this patent is extended or adjusted under 35 U.S.C. 154(b) by 0 days.

(21) Appl. No.: 13/379,594

(22) PCT Filed: Oct. 27, 2010

(86) PCT No.: PCT/CN2010/078144
§ 371 (c)(1),
(2), (4) Date: Dec. 20, 2011

(87) PCT Pub. No.: WO2011/143898
PCT Pub. Date: Nov. 24, 2011

(65) Prior Publication Data
US 2013/0198944 A1 Aug. 8, 2013

(51) Int. Cl.
*E03D 1/00* (2006.01)
(52) U.S. Cl.
USPC ............................................................ 4/415

(58) Field of Classification Search
USPC ...................................................... 4/353–419
See application file for complete search history.

(56) References Cited

U.S. PATENT DOCUMENTS 5,742,951 A * 4/1998 Wright et al. ...................... 4/381
5,862,537 A * 1/1999 Osmond ............................ 4/363

FOREIGN PATENT DOCUMENTS

| CN | 2033466 U | * | 3/1989 |
| CN | 2613526 Y | * | 4/2004 |
| CN | 2886262 Y | * | 4/2007 |

* cited by examiner

*Primary Examiner* — Lori Baker

(57) ABSTRACT

A water leakage protecting device includes a ratchet, a pawl and an auxiliary floater. The ratchet is formed on an outer wall of a floater of a water inlet valve. The auxiliary floater has a floating cavity and a weight cavity therein. The weight cavity has a water drain hole at a bottom thereof. The auxiliary floater is coupled to the water inlet valve through a rotating shaft. The pawl corresponds in position to the ratchet and is connected to one side of the auxiliary floater close to the floater of the water inlet valve. The water leakage protecting device can avoid water waste and ensure toilet safety.

3 Claims, 13 Drawing Sheets

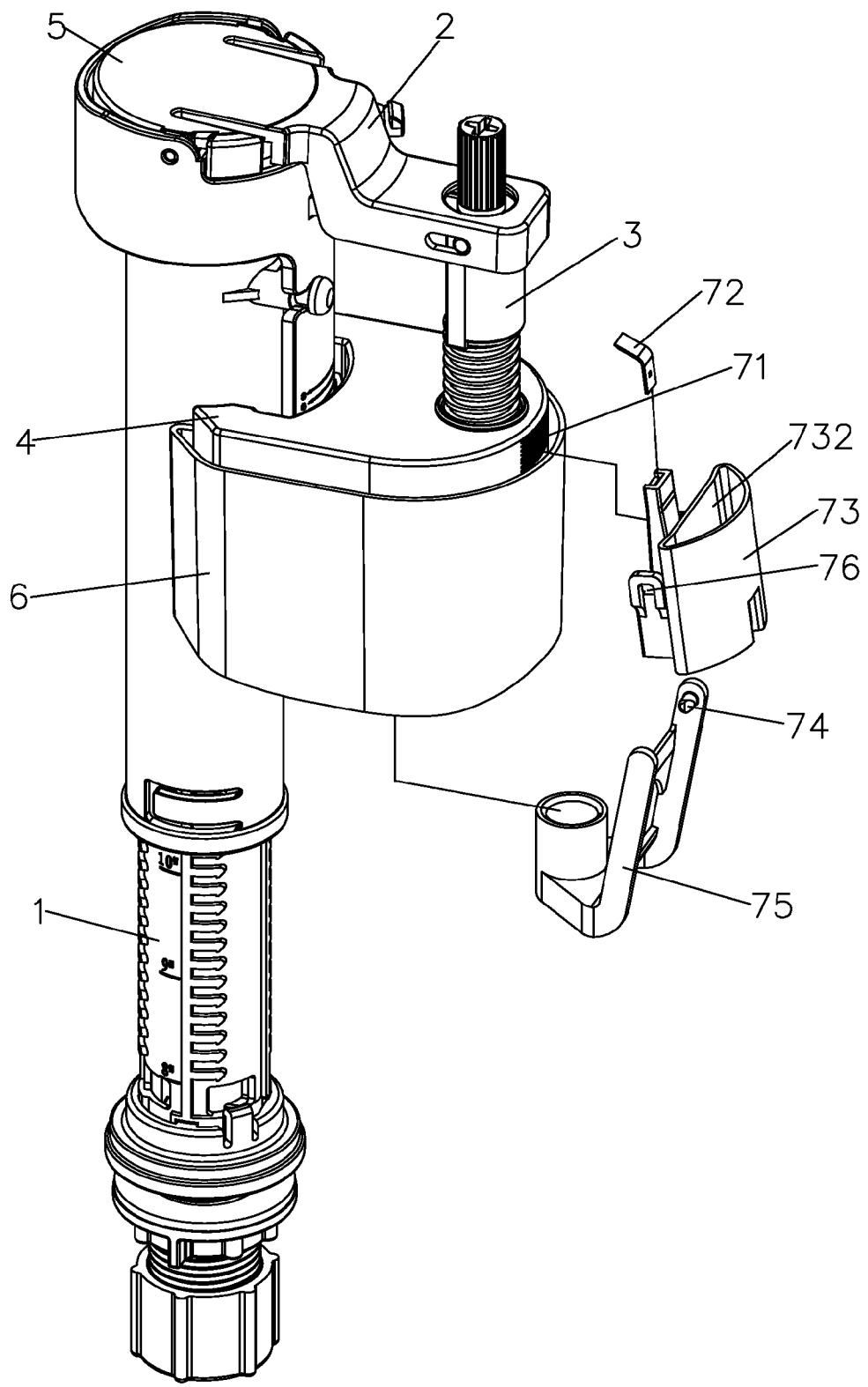
F I G. 3

WATER LEAKAGE PROTECTING DEVICE

BACKGROUND OF THE INVENTION

1. Field of the Invention

The present invention relates to a water leakage protecting device, and more particularly to a water leakage protecting device for a water inlet valve to stop inflow of water when a toilet or a drain valve is leaking so as to avoid water waste.

2. Description of the Prior Art

As shown in FIG. 1 and FIG. 2, a conventional water inlet valve of a toilet comprises a water inlet pipe 1, a connection rod 2, an adjustment screw 3, a floater 4, a needle valve 5 and a water container 6. The needle valve 5 is mounted on top of the water inlet pipe 1. The needle valve 5 has a back pressure hole 51 and a pivot seat 52. One end of the connection rod 2 is pivotally connected to the needle valve 5, and has a stop plug 53 located above the back pressure hole 51. The other end of the connection rod 2 is pivotally connected to the upper end of the adjustment rod 3. The lower end of the adjustment rod 3 is connected to the floater 4. The floater 4 is connected in the water container 6. When the water container 6 is filled with water, the floater 4 brings the connection rod 2 to tilt upward by buoyancy to overcome gravity. The stop plug 53 on the connection rod 2 blocks the back pressure hole 51 for the water inlet valve to stop inflow of water. When the water in the water container 6 is drained out, the floater 4 drops by gravity to bring the connection rod 2 to tilt downward and to open the back pressure hole 51, so the water inlet valve starts inflow of water.

When in use, the flush toilet may be leaking because the water drain valve is not closed tightly. The water lever of the flush toilet is always lower than the water lever to stop inflow of water. The water container 6 cannot be consistently filled with water. The floater 4 cannot bring the connection rod 2 to tilt because the buoyancy is not enough, so that the stop plug 53 is unable to block the back pressure hole 51. The water inlet valve is always in a state for inflow of water. This causes water waste Accordingly, the inventor of the present invention has devoted himself based on his many years of practical experiences to solve these problems.

SUMMARY OF THE INVENTION

The primary object of the present invention is to provide a water leakage protecting device for the water inlet valve to stop inflow of water when the toilet or the drain valve is leaking so as to avoid water waste.

In order to achieve the aforesaid object, the water leakage protecting device of the present invention comprises a ratchet, a pawl and an auxiliary floater. The ratchet is formed on an outer wall of a floater of a water inlet valve. The auxiliary floater has a floating cavity and a weight cavity therein. The weight cavity has a water drain hole at a bottom thereof. The auxiliary floater is coupled to the water inlet valve through a rotating shaft. The pawl corresponds in position to the ratchet and is connected to one side of the auxiliary floater close to the floater of the water inlet valve. When the water inlet valve is activated for inflow of water, the auxiliary floater is pivoted upward through the rotating shaft by buoyancy and approaches the water container of the water inlet valve, the floater rises in the water container by buoyancy, and the pawl engages with the ratchet. When the water is drained normally, the auxiliary floater is pivoted downward through the rotating shaft by gravity, the pawl disengages from the ratchet, and the water inlet valve starts inflow of water. When a drain valve or other parts of a water tank of a toilet malfunctions to cause water leakage, the pawl engages with the ratchet to stop drop of the floater through cooperation of the ratchet and the pawl so as to stop inflow of water.

Preferably, the water container of the water inlet valve is provided with a fixture. The rotating shaft is mounted on the fixture. The auxiliary floater has a pivot hole. The auxiliary floater is coupled to the fixture through the rotating shaft and the pivot hole.

Preferably, the auxiliary floater is coupled to the water container of the water inlet valve through the rotating shaft.

When the water inlet valve is activated for inflow of water, the auxiliary floater is pivoted upward through the rotating shaft by buoyancy and approaches the water container. When the water lever reaches to that the buoyancy of the auxiliary floater is greater than its weight, the auxiliary floater approaches the water container and the inflow of water is continued until the floater of the water inlet valve is lifted to stop inflow of water. This moment, the pawl engages with the ratchet.

When the water is drained normally, the water lever lowers quickly and the water in the weight cavity is drained slowly to generate counterweight. When the buoyancy of the auxiliary floater is smaller than gravity, the auxiliary floater is pivoted downward through the rotating shaft by gravity to be away from the water container of the water inlet valve and the auxiliary floater is away from the floater of the water inlet valve. The pawl disengages from the ratchet, and the water inlet valve starts inflow of water.

When the drain valve or other parts of the water tank of the toilet malfunctions to cause water leakage, the water lever in the toilet slowly lowers and the water in the weight cavity flows to the toilet from the water drain hole. When the water lever in the weight cavity is consistent with the water lever of the toilet, the water in the weight cavity won't generate a counterweight function. The buoyance of the auxiliary floater is still greater than gravity, the auxiliary floater won't be pivoted, and the pawl engages with the ratchet. When the water lever is lower than the auxiliary floater until the auxiliary floater loses buoyancy, the ratchet of the floater of the water inlet valve slowly presses on the pawl. After the buoyancy of the auxiliary floater disappears completely, the weight of the floater of the water inlet valve is greater than the weight of the auxiliary floater to stop drop of the floater through the cooperation of the ratchet and the pawl so as to stop inflow of water.

BRIEF DESCRIPTION OF THE DRAWINGS

FIG. 3 is an exploded view seen from the top according to a preferred embodiment of the present invention;

DETAILED DESCRIPTION OF THE PREFERRED EMBODIMENTS

Figure 1:
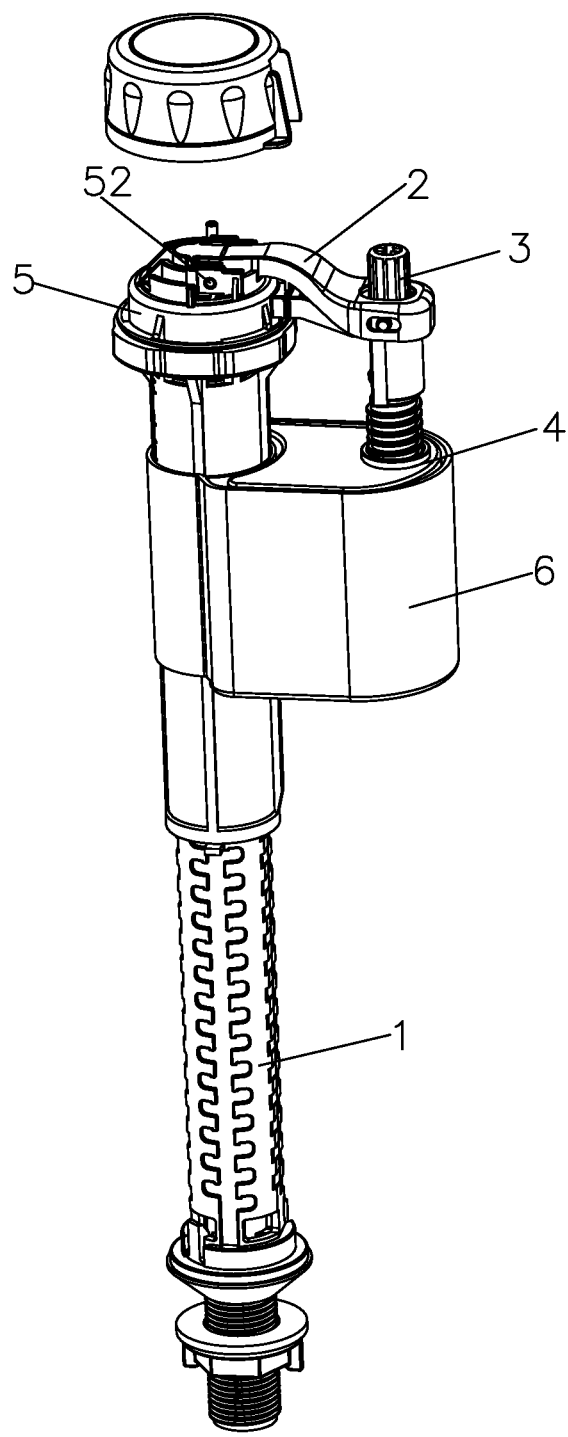
FIG. 1 is a perspective view of a conventional water inlet valve.
Figure 2:
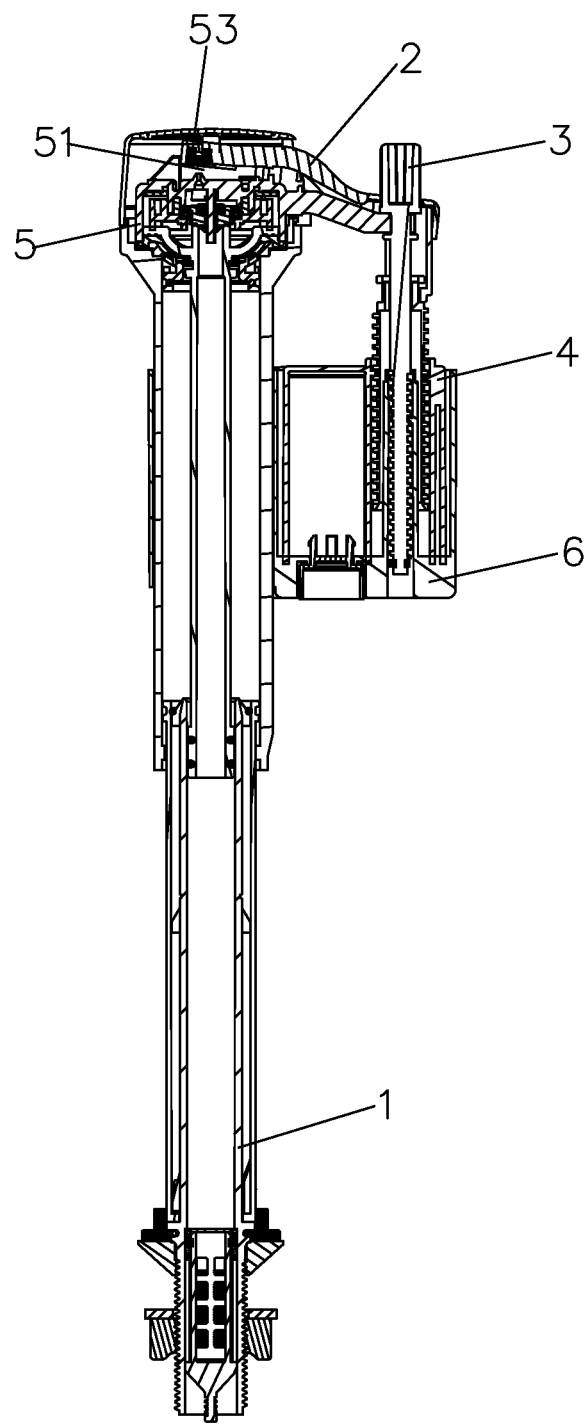
FIG. 2 is a sectional view of the conventional water inlet valve.
Figure 4:
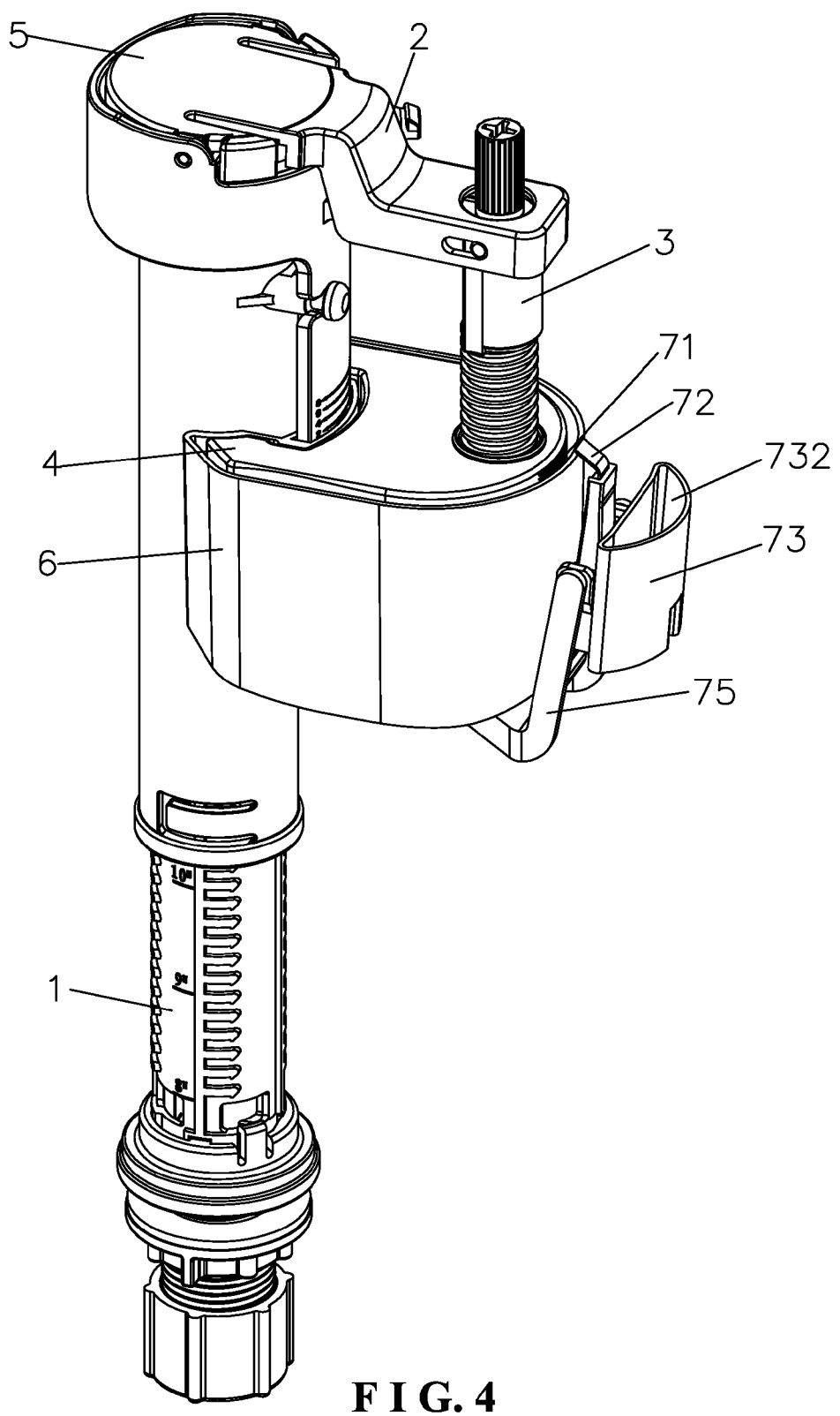
FIG. 4 is a perspective view seen from the top according to the preferred embodiment of the present invention.
Figure 5:
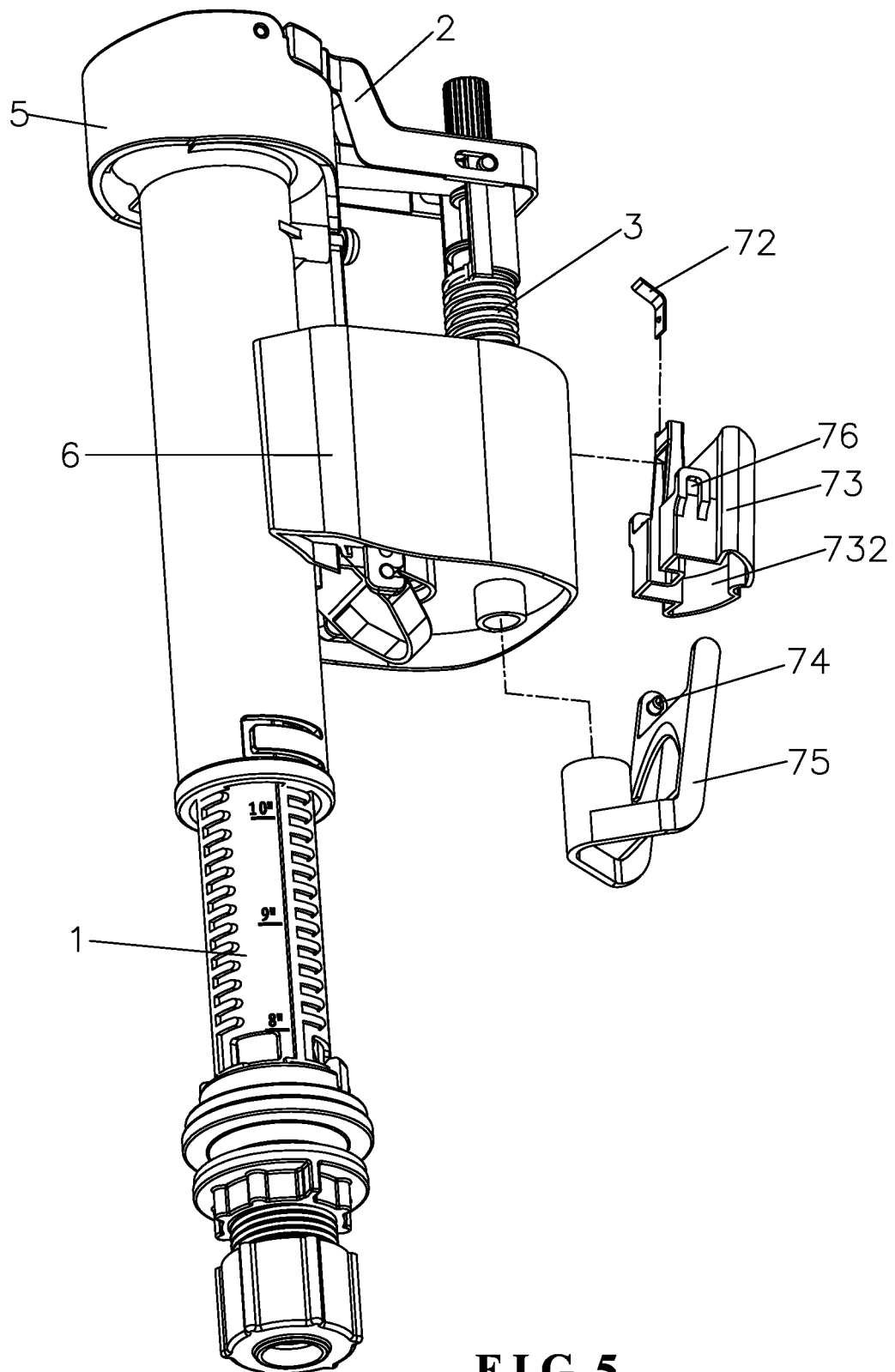
FIG. 5 is an exploded view seen from the bottom according to a preferred embodiment of the present invention.
Figure 6:
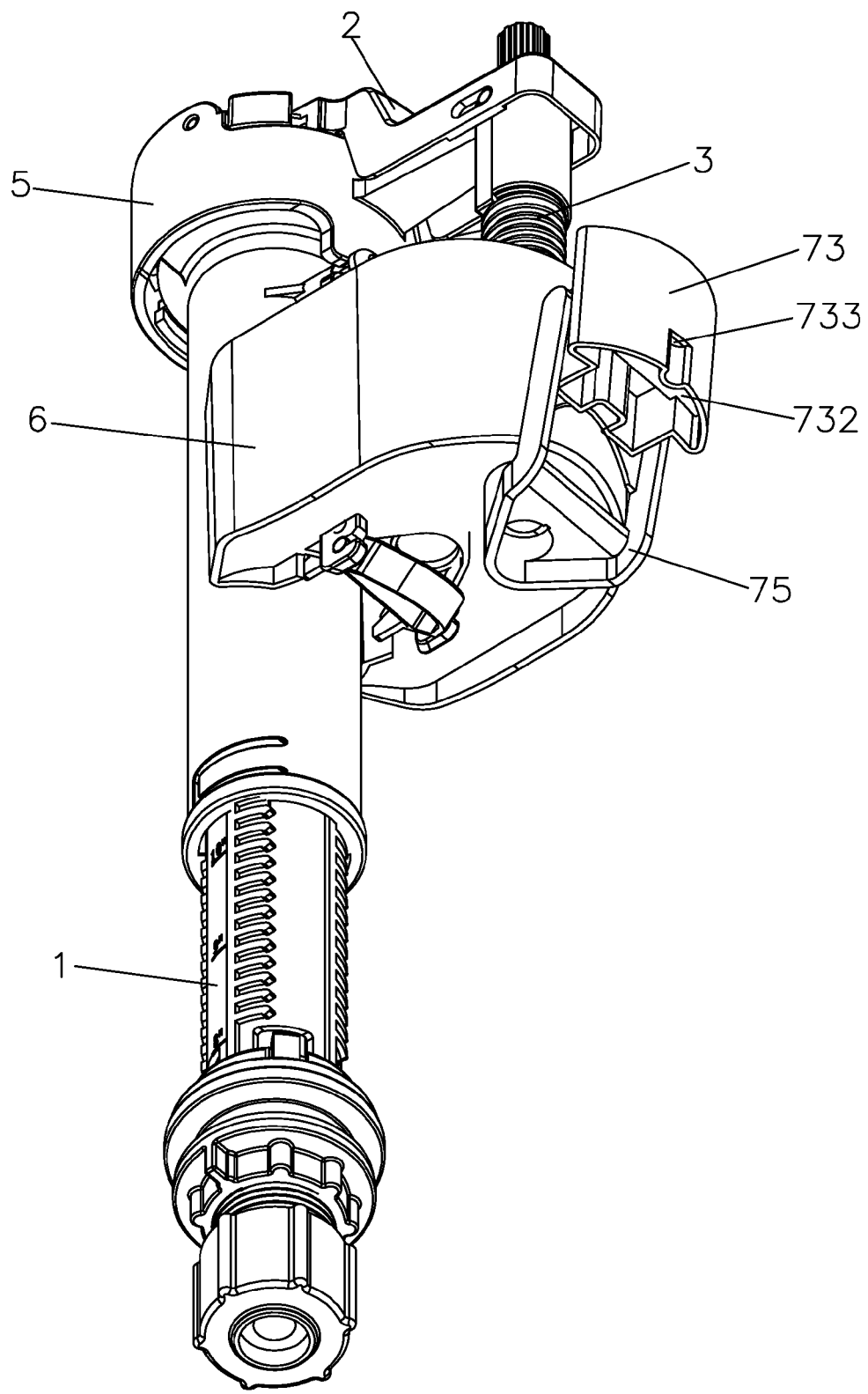
FIG. 6 is a perspective view seen from the bottom according to the preferred embodiment of the present invention.

Embodiments of the present invention will now be described, by way of example only, with reference to the accompanying drawings.

As shown in FIG. 3 through FIG. 6, the water leakage protecting device of the present invention comprises a ratchet 71, a pawl 72, and an auxiliary floater 73. The present invention is used to a water inlet valve which comprises a water inlet pipe 1, a connection rod 2, an adjustment screw 3, a floater 4, a needle valve 5 and a water container 6. As to the configuration and the number of parts, please refer to the aforesaid.

The ratchet 71 is formed on an outer wall of the floater 4 of the water inlet valve.

The auxiliary floater 73 is coupled to the water inlet valve through a rotating shaft 74. In this embodiment, the auxiliary floater 73 is coupled to the water container 6 of the water inlet valve through a rotating shaft 74. Preferably, the water container 6 is provided with a fixture 75. The rotating shaft 74 is mounted on the fixture 75. The auxiliary floater 73 has a pivot hole 76. The auxiliary floater 73 is coupled to the fixture 75 through the rotating shaft 74 and the pivot hole 76. For the water inlet valve to be opened and closed precisely, the auxiliary floater 73 has a floating cavity 731 and a weight cavity 732 therein. The weight cavity 732 has a water drain hole 733 at a bottom thereof. When the water is drained normally, the weight of the auxiliary floater 73 is increased and the auxiliary floater 73 is disengaged from the floater 4 to release the limitation to the floater 4. This is beneficial to open the water inlet valve. When the water is drained abnormally (for example, the toilet or the water inlet valve is leaking water), the weight of the auxiliary floater 73 is decreased by means of the water drain hole 73 to drain water slowly. The buoyance of the auxiliary floater 73 is greater than its weight, so the auxiliary floater 73 won't be deflected. The auxiliary floater 73 keeps the pawl 72 to engage with the ratchet 71, and won't be disengaged from the floater 4 to prevent the floater 4 from dropping so as to close the water inlet valve.

The pawl 72 corresponds in position to the ratchet 71 and is connected to one side of the auxiliary floater 73 close to the floater 4 of the water inlet valve.

Figure 7:
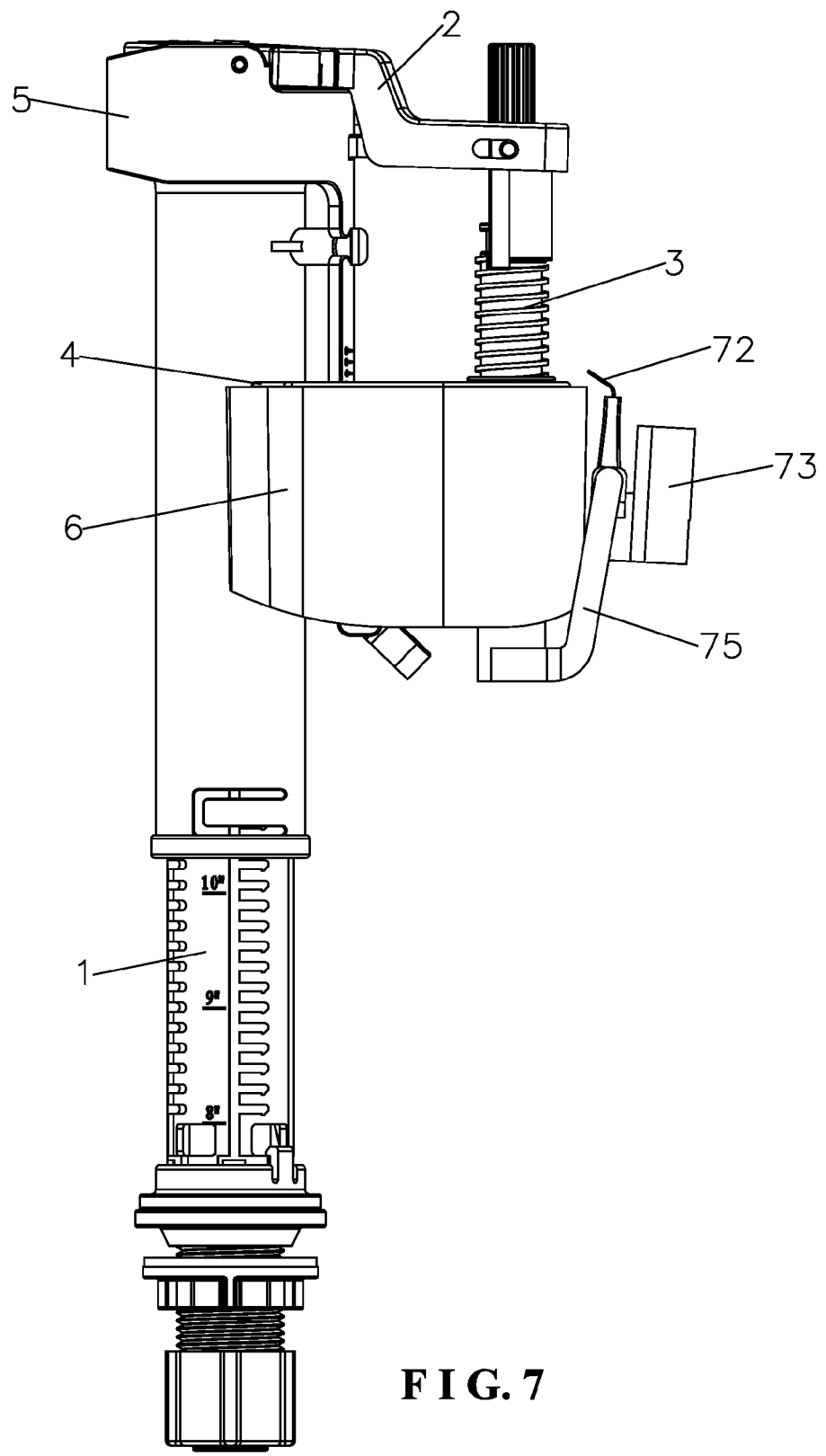
FIG. 7 is a side view of the preferred embodiment of the present invention in a free state.
Figure 8:
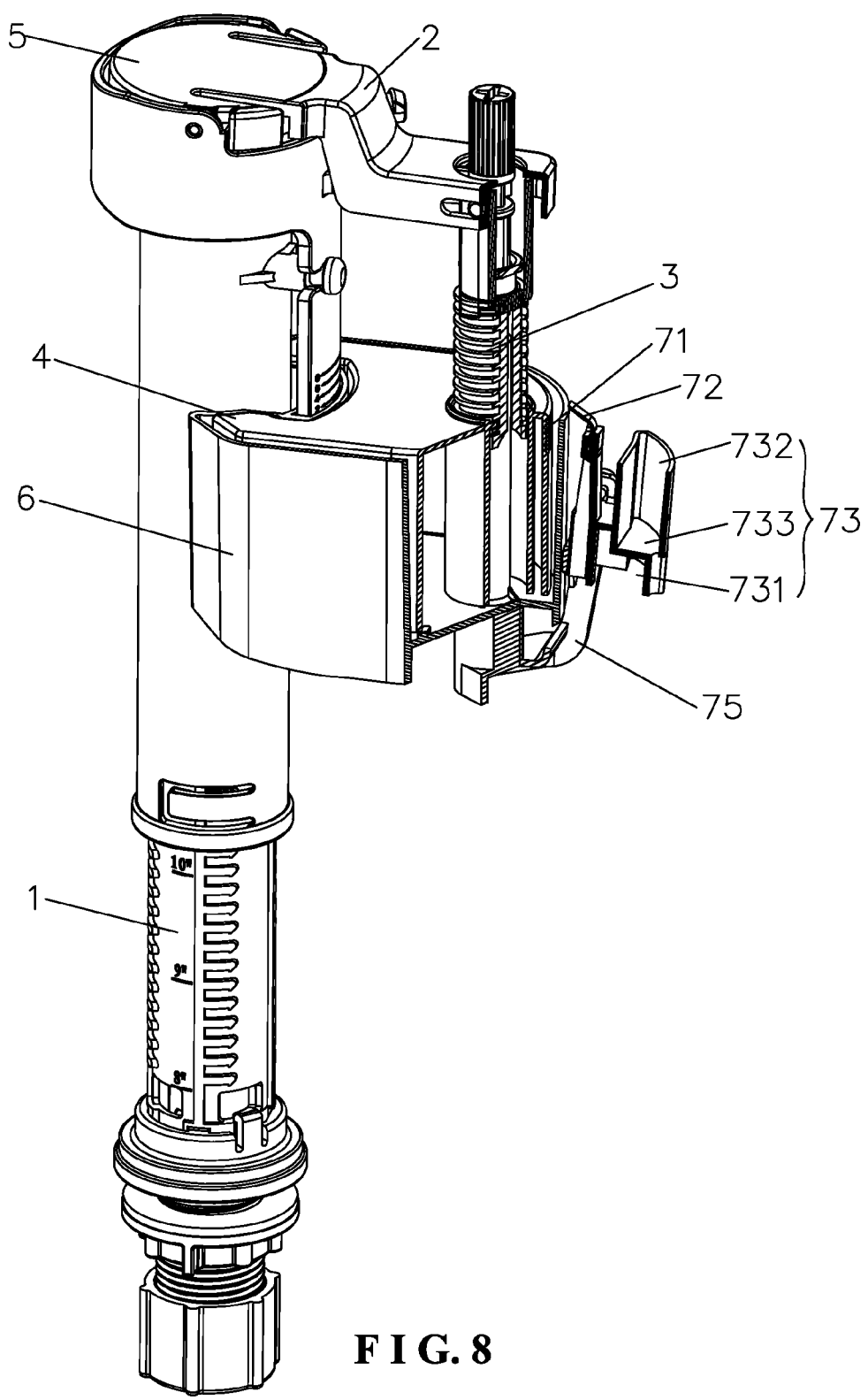
FIG. 8 is a partial sectional view of the preferred embodiment of the present invention in a free state.

As shown in FIG. 7 and FIG. 8, when the present invention is used in a free state, the auxiliary floater 73 has no buoyance by gravity and disengages from the floater 4 of the water inlet valve.

Figure 9:
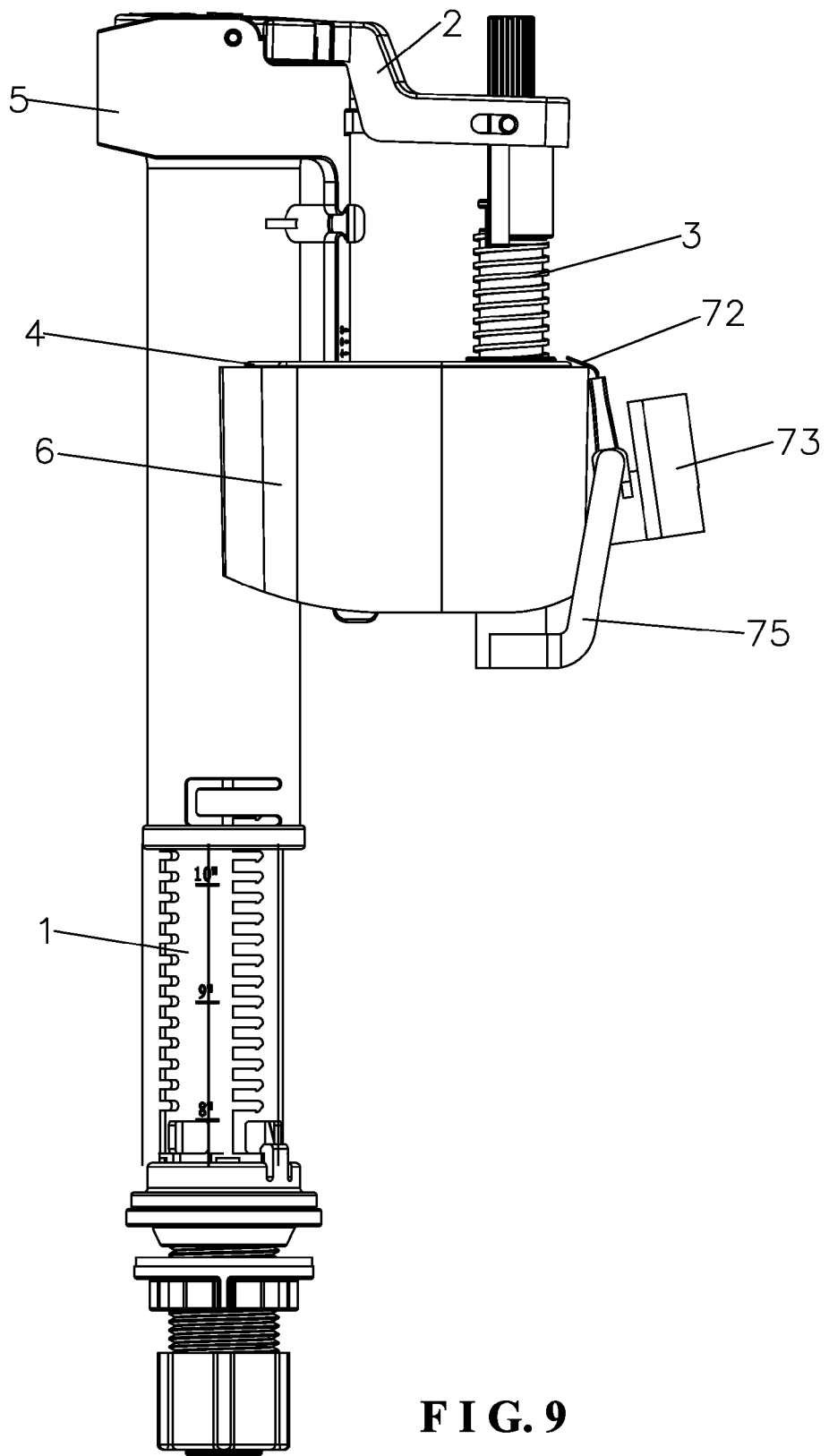
FIG. 9 is a side view of the preferred embodiment of the present invention in a state for inflow of water.
Figure 10:
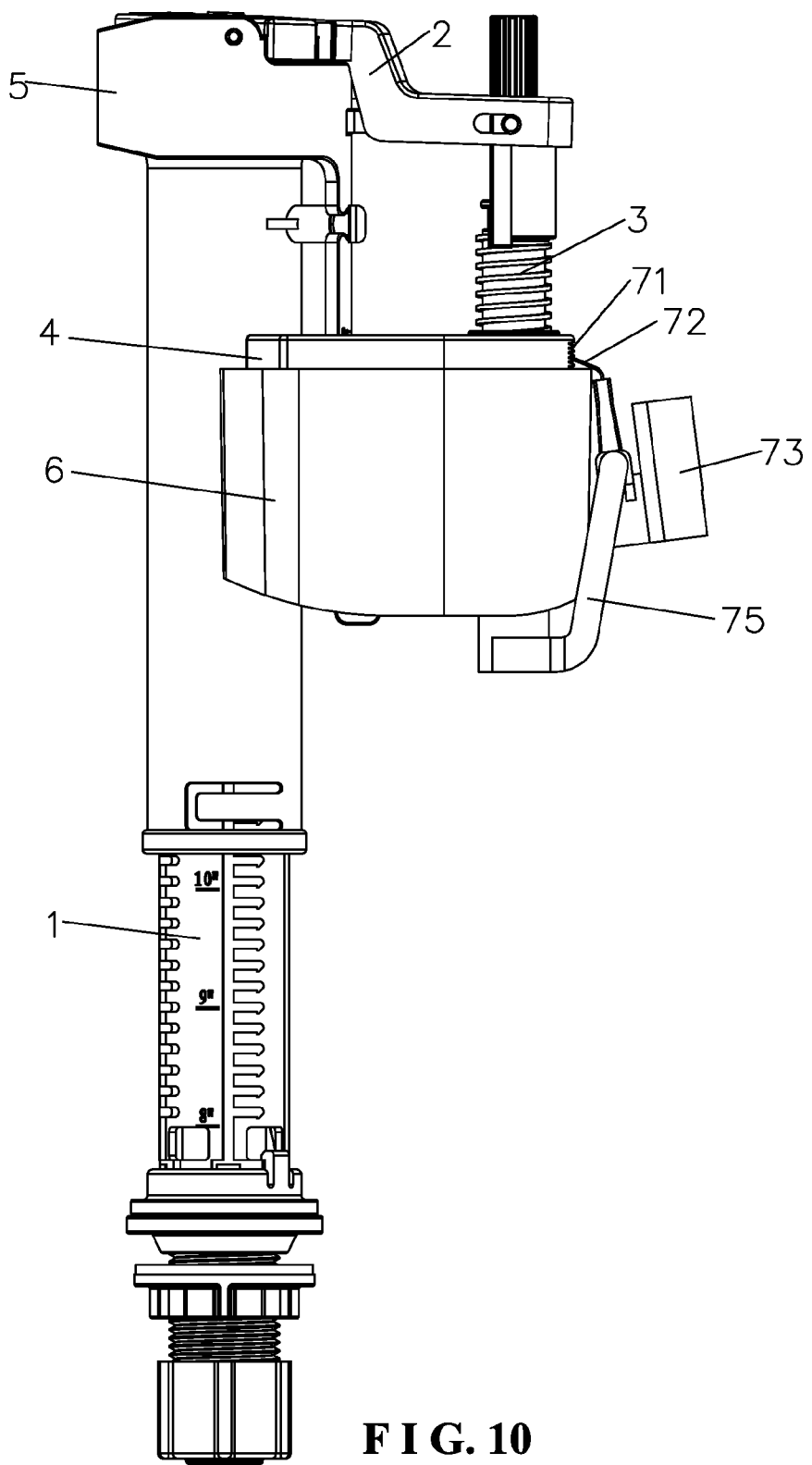
FIG. 10 is a side view of the preferred embodiment of the present invention showing that the water inlet valve stops inflow of water.
Figure 11:
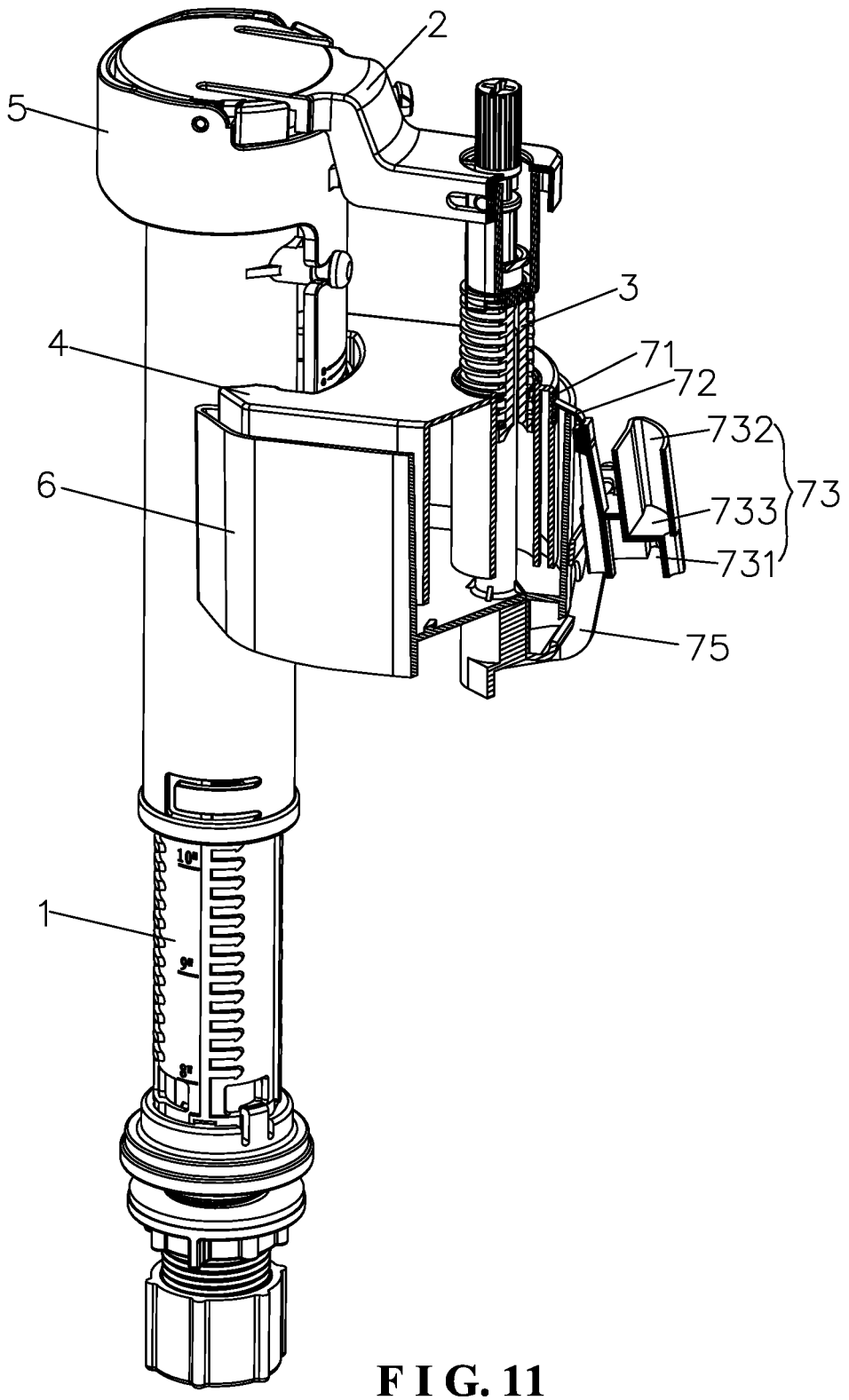
FIG. 11 is a partial sectional of the preferred embodiment of the present invention showing that the water inlet valve stops inflow of water.
Figure 12:
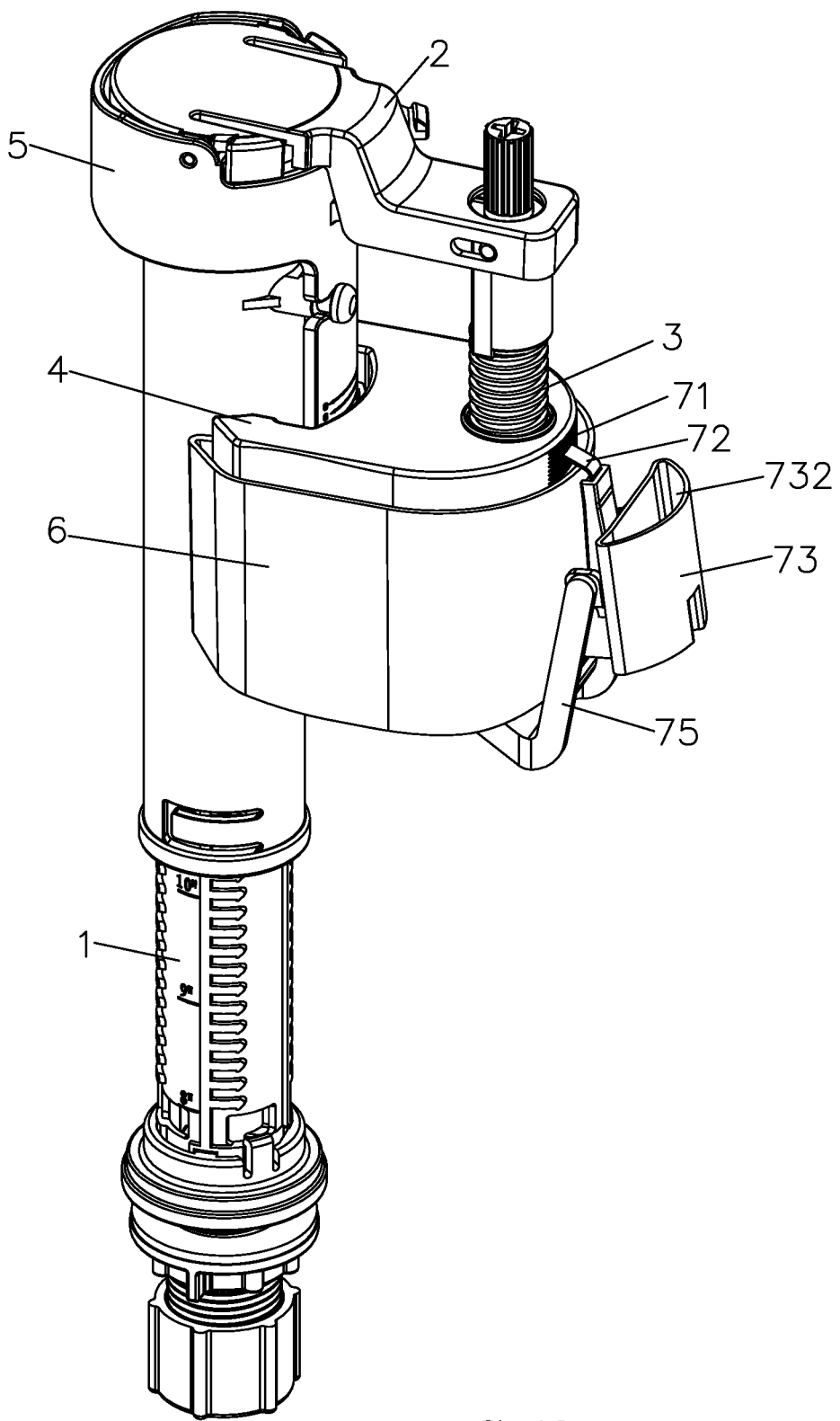
FIG. 12 is a perspective of the preferred embodiment of the present invention showing that the water inlet valve stops inflow of water.

As shown in FIG. 9, when the water inlet valve is activated for inflow of water, the auxiliary floater 73 is pivoted upward through the rotating shaft 74 by buoyancy and approaches the water container 6. When the water lever reaches to that the buoyance of the auxiliary floater 73 is greater than its weight, as shown in FIG. 10 through FIG. 12, the auxiliary floater 73 approaches the water container 6 and the inflow of water is continued until the floater 4 of the water inlet valve is lifted to stop inflow of water. This moment, the pawl 72 engages with the ratchet 71 to complete inflow of water.

Figure 13:
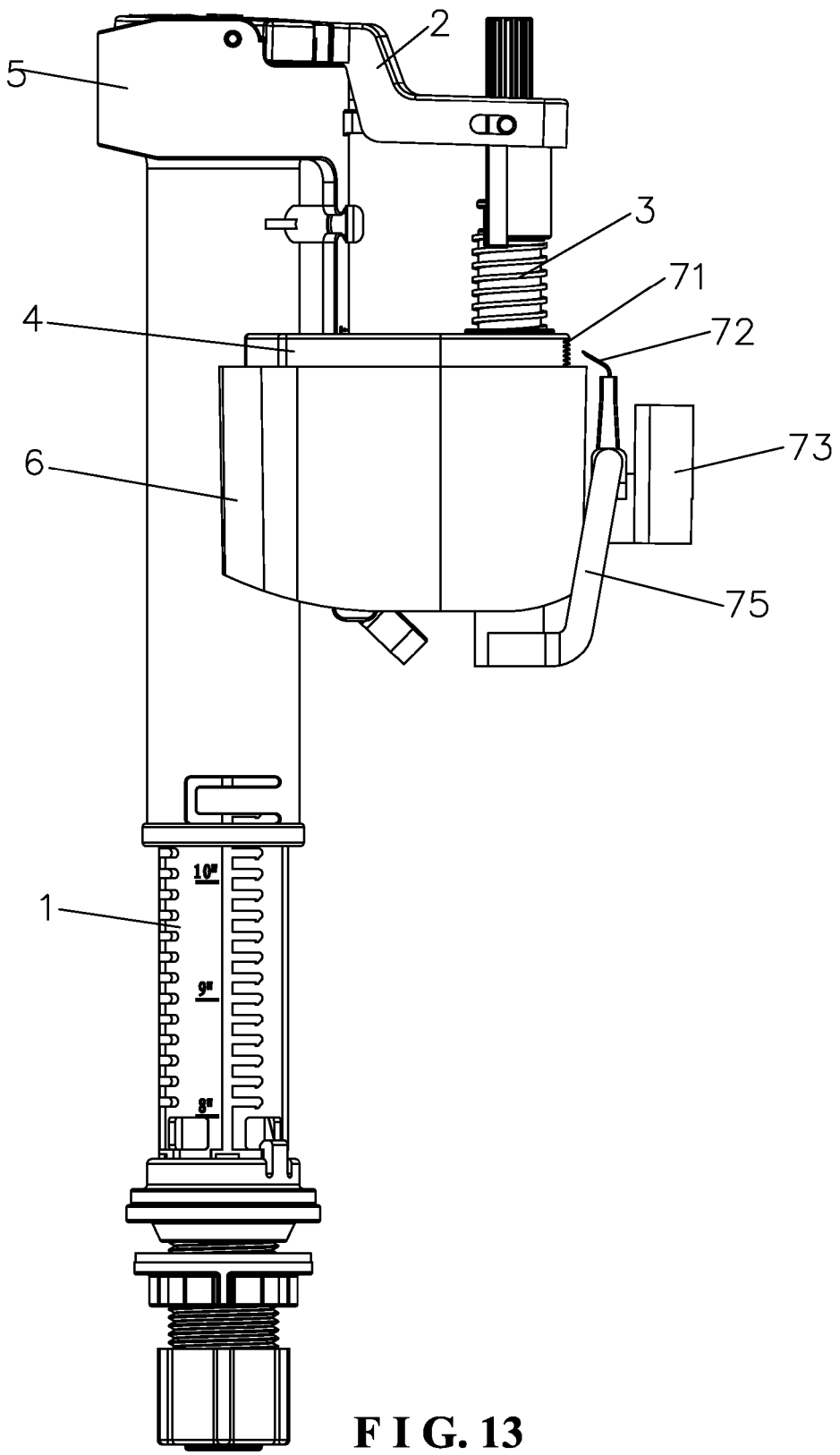
FIG. 13 is a side view of the preferred embodiment of the present invention in a state to drain water.

When the water is drained normally, as shown in FIG. 13, the water lever lowers quickly and the water in the weight cavity 732 is drained slowly to generate counterweight. When the buoyancy of the auxiliary floater 73 is smaller than gravity, the auxiliary floater 73 is pivoted downward through the rotating shaft 74 by gravity to be away from the water container 6 of the water inlet valve and the auxiliary floater 73 is away from the floater 4. After the pawl 72 disengages from the ratchet 71, the floater 4 is lowered when the water in the water container 6 is drained out to bring the connection rod 2 to tilt downward for inflow of water.

When the drain valve or other parts of the water tank of the toilet malfunctions to cause water leakage, the water lever in the toilet slowly lowers and the water in the weight cavity 732 flows to the toilet from the water drain hole 733. When the water lever in the weight cavity 732 is consistent with the water lever of the toilet, the water in the weight cavity 732 won't generate a counterweight function. The buoyance of the auxiliary floater 73 is still greater than gravity, the auxiliary floater 73 won't be pivoted, and the pawl 72 engages with the ratchet 71. When the water lever is lower than the auxiliary floater 73 until the auxiliary floater loses buoyancy, the ratchet 71 of the floater 4 of the water inlet valve slowly presses on the pawl 72. After the buoyancy of the auxiliary floater 73 disappears completely, the weight of the floater 4 of the water inlet valve is greater than the weight of the auxiliary floater 73 to stop drop of the floater 4 through the cooperation of the ratchet 71 and the pawl 72 so as to stop inflow of water.

When the user wants to flush the toilet, he/she will notice there is no water in the toilet and check the toilet for repair. This can avoid water waste.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A water leakage protecting device, comprising a ratchet, a pawl and an auxiliary floater, the ratchet being formed on an outer wall of a floater of a water inlet valve, the auxiliary floater having a floating cavity and a weight cavity therein, the weight cavity having a water drain hole at a bottom thereof, the auxiliary floater being coupled to the water inlet valve through a rotating shaft, the pawl corresponding in position to the ratchet and being connected to one side of the auxiliary floater close to the floater of the water inlet valve; wherein when the water inlet valve is activated for inflow of water, the auxiliary floater is pivoted upward through the rotating shaft by buoyancy and approaches the water container of the water inlet valve, the floater rises in the water container by buoyancy, and the pawl engages with the ratchet; wherein when the water is drained normally, the auxiliary floater is pivoted downward through the rotating shaft by gravity, the pawl disengages from the ratchet, and the water inlet valve starts inflow of water; wherein when a drain valve or other parts of a water tank of a toilet malfunctions to cause water leakage, the pawl engages with the ratchet to stop drop of the floater through cooperation of the ratchet and the pawl so as to stop inflow of water.

2. The water leakage protecting device as claimed in claim 1, wherein the water container of the water inlet valve is provided with a fixture, the rotating shaft is mounted on the fixture, the auxiliary floater has a pivot hole, and the auxiliary floater is coupled to the fixture through the rotating shaft and the pivot hole.

3. The water leakage protecting device as claimed in claim 2, wherein the auxiliary floater is coupled to the water container of the water inlet valve through the rotating shaft.

\* \* \* \* \*